United States Patent
Moen et al.

(10) Patent No.: US 8,826,411 B2
(45) Date of Patent: Sep. 2, 2014

(54) CLIENT-SIDE EXTENSIONS FOR USE IN CONNECTION WITH HTTP PROXY POLICY ENFORCEMENT

(75) Inventors: Doug Moen, Waterloo (CA); Alex Campbell, Woodinville, WA (US)

(73) Assignee: Blue Coat Systems, Inc., Sunnyvale, CA (US)

( * ) Notice: Subject to any disclaimer, the term of this patent is extended or adjusted under 35 U.S.C. 154(b) by 1667 days.

(21) Appl. No.: 11/376,917

(22) Filed: Mar. 15, 2006

(65) Prior Publication Data

US 2007/0220599 A1    Sep. 20, 2007

(51) Int. Cl.
*H04L 29/06* (2006.01)

(52) U.S. Cl.
CPC ........ *H04L 63/0281* (2013.01); *H04L 63/1408* (2013.01); *H04L 63/0227* (2013.01)
USPC .......................................................... 726/12

(58) Field of Classification Search
CPC ............ H04L 63/0281; H04L 63/1408; H04L 63/0227
See application file for complete search history.

(56) References Cited

U.S. PATENT DOCUMENTS

| | | | | |
|---|---|---|---|---|
| 6,119,165 A * | 9/2000 | Li et al. | ........................... | 709/229 |
| 6,219,786 B1 * | 4/2001 | Cunningham et al. | ......... | 713/152 |
| 6,381,639 B1 * | 4/2002 | Thebaut et al. | ............... | 709/222 |
| 6,539,425 B1 * | 3/2003 | Stevens et al. | ................ | 709/220 |
| 6,742,043 B1 * | 5/2004 | Moussa et al. | ................ | 709/232 |
| 6,816,965 B1 * | 11/2004 | Moore et al. | .................. | 713/158 |
| 6,892,224 B2 * | 5/2005 | Strahm et al. | ................. | 709/213 |
| 6,904,523 B2 * | 6/2005 | Bialick et al. | ................. | 713/156 |
| 7,062,552 B2 * | 6/2006 | Jung | .............................. | 709/224 |
| 7,124,188 B2 * | 10/2006 | Mangipudi et al. | ........... | 709/226 |
| 7,249,196 B1 * | 7/2007 | Peiffer et al. | .................. | 709/246 |
| 7,340,521 B1 * | 3/2008 | Karandikar et al. | .......... | 709/226 |
| 7,356,692 B2 * | 4/2008 | Bialick et al. | ................. | 713/156 |
| 7,433,944 B2 * | 10/2008 | Kanada et al. | ................. | 709/223 |
| 7,447,755 B1 * | 11/2008 | Maxted et al. | ................. | 709/223 |
| 7,457,951 B1 * | 11/2008 | Proudler et al. | .............. | 713/164 |
| 7,568,201 B2 * | 7/2009 | Suryanarayana et al. | ..... | 719/315 |
| 7,574,486 B1 * | 8/2009 | Cheng et al. | .................. | 709/219 |
| 7,707,636 B2 * | 4/2010 | Catanzano | ....................... | 726/24 |
| 7,724,281 B2 * | 5/2010 | Vale et al. | .................... | 348/207.1 |
| 7,818,435 B1 * | 10/2010 | Jellinek | .......................... | 709/229 |
| 7,836,506 B2 * | 11/2010 | Liu | .................................. | 726/25 |
| 8,069,461 B2 * | 11/2011 | Angiolillo et al. | .............. | 725/46 |
| 8,103,965 B2 * | 1/2012 | Roberts et al. | ................ | 715/772 |
| 8,112,500 B2 * | 2/2012 | Saito et al. | .................... | 709/218 |
| 8,112,549 B2 * | 2/2012 | Srinivasan et al. | ............ | 709/248 |
| 8,171,077 B2 * | 5/2012 | Huynh et al. | ................. | 709/203 |
| 8,195,822 B2 * | 6/2012 | McMahan et al. | ............. | 709/230 |
| 8,214,506 B2 * | 7/2012 | Ragunathan et al. | ......... | 709/227 |
| 8,220,037 B2 * | 7/2012 | Snyder et al. | ..................... | 726/7 |
| 2002/0087730 A1 * | 7/2002 | Yonekura | ....................... | 709/247 |
| 2002/0161743 A1 * | 10/2002 | Brebner et al. | ................... | 707/1 |
| 2002/0174236 A1 * | 11/2002 | Mathur et al. | ................. | 709/229 |
| 2003/0061387 A1 * | 3/2003 | Brown et al. | ................. | 709/246 |
| 2003/0115354 A1 * | 6/2003 | Schmidt et al. | ............... | 709/232 |
| 2003/0200332 A1 * | 10/2003 | Gupta et al. | .................. | 709/238 |

(Continued)

*Primary Examiner* — Michael R Vaughan
(74) *Attorney, Agent, or Firm* — Ascenda Law Group, PC

(57) ABSTRACT

A Web browser is configured to participate with a proxy server in enforcing traffic policies within a computer network. This may include modifying the Web browser to report contextual information regarding requests for Web documents to the proxy server and/or causing the Web browser to report information concerning Web documents requested through the proxy server to the proxy server.

20 Claims, 2 Drawing Sheets

(56) References Cited

U.S. PATENT DOCUMENTS

| | | | |
|---|---|---|---|
| 2004/0015824 A1* | 1/2004 | Felkey et al. | 717/104 |
| 2005/0037787 A1* | 2/2005 | Bachner et al. | 455/502 |
| 2005/0144315 A1* | 6/2005 | George et al. | 709/238 |
| 2005/0188220 A1* | 8/2005 | Nilsson et al. | 713/201 |
| 2007/0072605 A1* | 3/2007 | Poczo | 455/432.2 |
| 2007/0136579 A1* | 6/2007 | Levy et al. | 713/168 |
| 2010/0005527 A1* | 1/2010 | Jeon | 726/22 |
| 2010/0017464 A1* | 1/2010 | Cheng et al. | 709/203 |

\* cited by examiner

CLIENT-SIDE EXTENSIONS FOR USE IN CONNECTION WITH HTTP PROXY POLICY ENFORCEMENT

FIELD OF THE INVENTION

The present invention relates to the use of proxy servers for enforcing policies with respect to traffic in a computer network and, more particularly, to methods and systems for provisioning client applications such as Web browsers to perform various actions related to such enforcement activities.

BACKGROUND

A proxy server is a software application (sometimes embodied in a separate computer-based apparatus) located logically between a client application, such as a Web browser, and a content source (such as a Web server) that intercepts requests from the client to the content source to see if it can fulfill the requests itself. If not, the proxy server forwards the request to the content source. In general, proxy servers have two main purposes: to reduce latency and to filter requests.

For example, proxy servers can improve response times to fulfill client requests by offloading content from a content source and positioning that content closer (logically and, in some cases physically) to one or more users. To illustrate this behavior, consider the case where two users, A and B, access the World Wide Web (the graphical interface of the Internet) through a common proxy server. If user A requests a certain Web page, that request will pass through the proxy server. Assuming the proxy does not already store a copy of the requested Web page, it will forward the request to the applicable origin server. When the requested content is returned, the proxy will store a copy of the Web page before sending it on to user A. Later, when user B requests the same Web page, the proxy server will simply return the previously stored copy which it obtained while fetching the page for user A. If the proxy server is on the same network as user B, as is often the case, this will generally be a much faster operation than would be the case if the new request had to travel all the way to the origin server and back.

Proxy servers can also be used to filter requests, for example by enforcing access restrictions imposed by a network administrator. Often, corporate network administrators will configure their networks so that requests directed outside of the network (e.g., to internet Web sites or other resources) pass through one or more proxy servers where they are examined. If the request is made to a restricted site (e.g., as identified by its Web address), the request may be blocked. Alternatively, or in addition, if the content returned from a particular resource is deemed to be noncompliant with one or more network policies (e.g., because it is suspected of containing a computer virus or to be from a restricted site), the content may be blocked from entering the corporate network.

In general, the proxy server can be configured to enforce a variety of rules or policies established by a network administrator. However, sometimes proper enforcement of these rules is made difficult (or impossible) because the proxy does not have sufficient information regarding the context within which an associated request was made. For example, earlier it was noted that users often make requests for Web pages. Hence, network administrators would often like to set policies for allowing or not allowing access to such Web pages. But Web "pages" are not true pages or documents in the sense that most users think of such items. That is, Web "pages" are really not pages at all, but instead are actually made up of computer-readable instructions (usually written in the hypertext markup language, html, or a similar computer-readable language) that instruct a software application (typically a Web browser) how to display certain things (e.g., text, images, etc.). Those things, typically called "objects" are usually stored separate from the computer instructions that make up the Web page, sometimes even at different content sources. Such objects are retrieved separately from the computer-readable instructions in response to requests for same made by the Web browser as it executes those instructions. For complex Web pages (such as those found at news Web sites and the like), this may involve dozens of requests concerning multiple objects to populate a single Web "page".

What this means then is that a single policy directed to a Web "page" really does not exist. Instead, policies have to be more fine-grained, often existing at the object level or directed to the identification of the content source providing the object. Even these policies, however, do not often work well because they cannot distinguish permissible instances of otherwise restricted content from impermissible instances thereof.

For example, take the case of an image that ordinarily would not be permitted within a corporate network according to one or more policies. It may be the case that the image is actually part of a Web page from an associated site (e.g., a news site) that is itself permitted to be viewed under the network policies. As the Web page loads in the requesting Web browser a request for the subject image is made. But because the proxy cannot recognize the context within which the request was made (i.e., that it is really a part of a presently loading Web page), that request (or the returned image) will be blocked.

Further examples of instances where traffic policy enforcement at a proxy is difficult exist. For example, there are a family of policies which require that the proxy add certain executable computer instructions to a Web document that is returned to a requesting Web browser so that the browser will take certain actions (e.g., block pop-up pages). But it would be inappropriate to add such instructions to other items, such as images, inasmuch as the instructions would be incompatible with those objects. Ordinarily the proxy can distinguish such objects on the basis of content type header information included in web documents, but this is not always the case. For example, certain JavaScript objects or cascading style sheets often purport to be html documents (for which the injection of executable computer instructions is appropriate) when in fact they are not (meaning the injection of such instructions is not appropriate). While the web browser that requested the items is capable of recognizing that the header information is wrong (and ignoring same), the proxy cannot make this assumption because it has no information concerning the context of the original request. As a result, the proxy may improperly inject the computer instructions into these items.

Accordingly, what is needed are improved techniques for facilitating network traffic filtering and other policy enforcement.

SUMMARY OF THE INVENTION

In one embodiment of the present invention, a set of computer-readable instructions which when executed by a computer processor cause the computer processor to perform activities directed to enforcing policies related to traffic within a computer network are downloaded from a proxy server to a client communicatively coupled thereto, the computer-readable instructions being embodied as a plug-in application for the client. In some cases, the computer-readable instructions may further cause the processor to report information regarding Web documents obtained by the client to the proxy server, for example information related to Active-X controls contained in the Web documents. Various sorts of activities may be involved, for example causing the client to include contextual information in requests for the Web documents made by the client. Such contextual information may include an indication of a source of a uniform resource locator (URL) to which one or more of the requests for the web documents are directed, or information identifying an object referenced by a uniform resource locator (URL) to which one or more of the requests for the Web documents are directed. The URL may, for example, indicate an embedded image or object in another Web document, name a script or style sheet, or be referenced by a <frame> or <iframe> tag.

In a further embodiment of the invention, a Web browser is instructed to report information concerning a Web document downloaded to the Web browser to a proxy server at which a request to download the Web document was received from the Web browser. Such instructions may be embedded within the Web document. Alternatively, a plug-in application for the Web browser may be downloaded from the proxy server, which plug-in application is configured to instruct said Web browser to report the information concerning the Web document to the proxy server. Such information may include information regarding Active-X controls included in the Web document.

Still another embodiment of the invention involves configuring a Web browser for participating with a proxy server in enforcing traffic policies within a computer network. This may include modifying the Web browser to report contextual information regarding requests for Web documents to the proxy server and/or causing the Web browser to report information concerning Web documents requested through the proxy server to the proxy server. In this latter case, the Web browser may be caused to report information according to computer-readable instructions inserted in the Web documents by the proxy server and/or by installing a plug-in application for use in connection with the Web browser. In further embodiments, a set of computer-readable instructions are downloaded to a client application, such as a Web browser, and those instructions, when executed by the client application, cause that application to perform one or more activities associated with network traffic policy enforcement. The computer-readable instructions may be embodied as a plug-in application, or executable JavaScript, Active-X controls, Java instructions or executable instructions included within a Web document requested by the client application.

The computer-readable instructions may, for example cause the client application to report, to the proxy server, information regarding requests made by the client application, or information about a current state of the client application. Likewise, contextual information regarding requests for Web documents made by the client application, or an indication of a source of a URL to which one or more requests made by the client application are directed. Alternatively, or in addition, the client application may be instructed to report information identifying an object referenced by a URL, or information about (i) a current state of the client application, and (ii) a context in which a request by the client application is being made.

In some cases the computer-readable instructions may cause the client application to take one or more actions to enforce the network traffic policy locally; to report information concerning one or more Web documents downloaded to the client application through the proxy server; or to report information identifying an object referenced by a URL indicating an embedded image or other object in a Web document.

BRIEF DESCRIPTION OF THE DRAWINGS

The present invention is illustrated by way of example, and not limitation, in the figures of the accompanying drawings in which.

DETAILED DESCRIPTION

Figure 1:
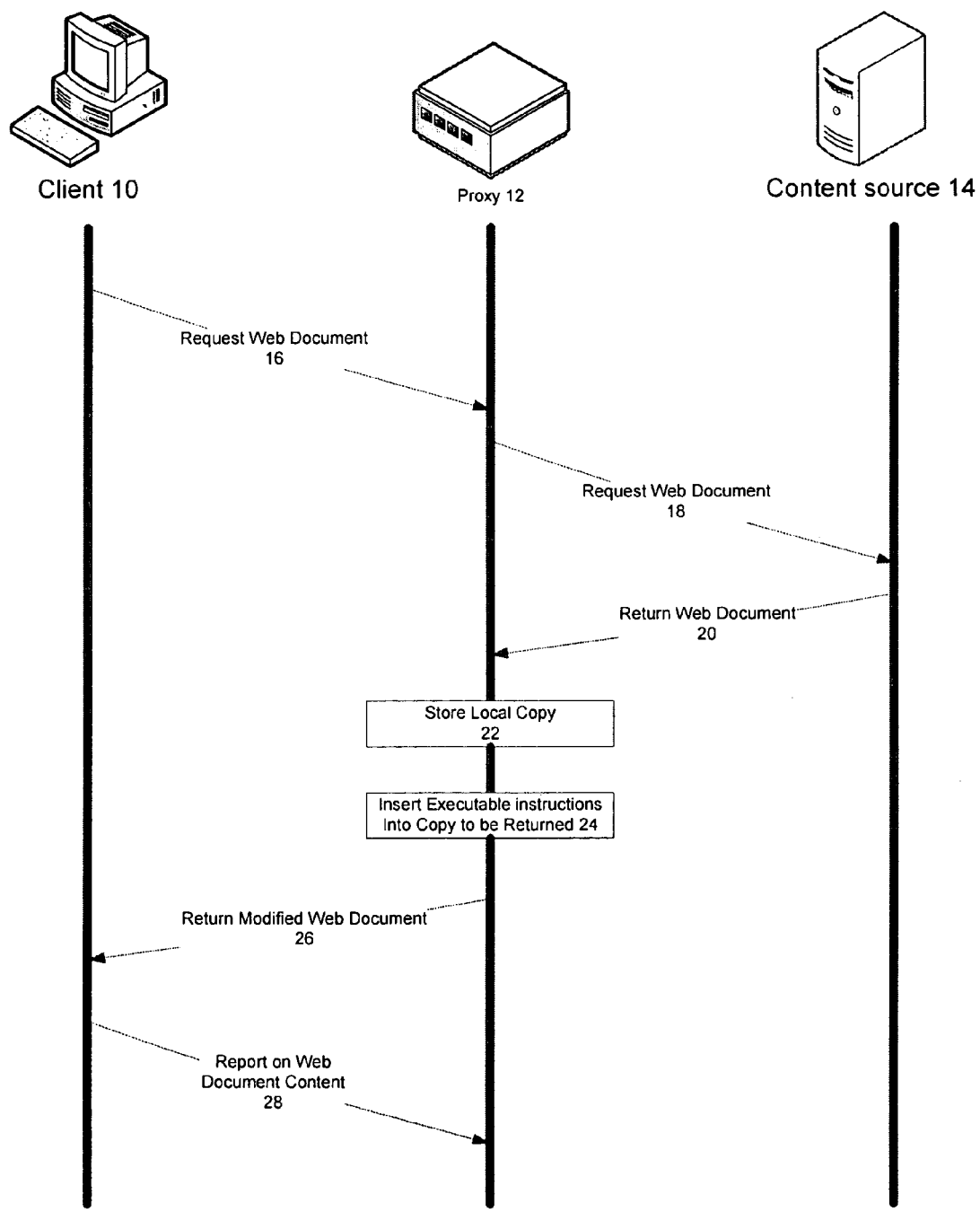
FIG. 1 illustrates an example of a communication session between a client application, a proxy server and a content source in which the proxy server inserts computer-executable instructions into a Web document returned by the content source to the client application so as to have the client application perform certain activities in accordance with embodiments of the present invention.

Described herein are methods and systems to facilitate the enforcing of policies with respect to traffic in a computer network and, more particularly, methods and systems for provisioning client applications such as Web browsers to perform various actions related to such enforcement activities. The present methods and systems provide for cooperation between proxy servers and clients serviced thereby to manage tasks associated with such policy enforcement. In some cases, client applications are tasked with performing certain activities to assist the proxy in performing policy enforcement. In other instances, clients are instructed to report information to a proxy so as to better facilitate the policy enforcement. These various embodiments of the present invention are described in detail below, however, such examples are not meant to limit the broader scope of the inventions as reflected in the claims following this description.

Along these lines, various embodiments of the present invention may be implemented with the aid of computer-implemented processes or methods (a.k.a. programs or routines) that may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™, JavaScript™, and the like. In general, however, all of the aforementioned terms as used herein are meant to encompass any series of logical steps performed in a sequence to accomplish a given purpose.

In view of the above, it should be appreciated that some portions of the detailed description that follows are presented in terms of algorithms and symbolic representations of operations on data within a computer memory. These algorithmic descriptions and representations are the means used by those skilled in the computer science arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. It should be borne in mind, however, that all of these and similar terms are to be associated with the appropriate physical quantities and are merely convenient labels applied to these quantities. Unless specifically stated otherwise, it will be appreciated that throughout the description of the present invention, use of terms such as "processing", "computing", "calculating", "determining", "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented with an apparatus to perform the operations described herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and processes presented herein are not inherently related to any particular computer or other apparatus. Various general-purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of ordinary skill in the art will immediately appreciate that the invention can be practiced with computer system configurations other than those described below, including hand-held devices, multiprocessor systems, microprocessor-based or programmable consumer electronics, DSP devices, network PCs, minicomputers, mainframe computers, and the like. The invention can also be practiced in distributed computing environments where tasks are performed by remote processing devices that are linked through a communications network. The required structure for a variety of these systems will appear from the description below.

As indicated above, the present methods and systems provide for dividing up tasks related to traffic policy enforcement between proxy servers and clients (particularly Web browsers) serviced thereby. One embodiment of the invention configures a Web browser for traffic policy enforcement by providing executable computer instructions in Web documents returned to a client by a proxy in response to a request for such documents. That is, the proxy is configured to insert computer-readable instructions (e.g., JavaScript) into a Web document as the proxy returns that document to a Web browser. The Web document may be one that was previously stored by the proxy or one that the proxy has retrieved from a separate content source in response to the client's original request. FIG. 1 illustrates this latter example.

A client (e.g., a Web browser executing on a user's personal computer) 10 makes a request 16 for a Web document (e.g., a Web page or other document). The request is intercepted at proxy server 12. The proxy checks to see if it stores a local copy of the requested document, but for purposes of this example assume no such copy is stored or that a previously stored copy is determined to be stale. As a result, the proxy 12 makes a request 18 for the Web document to a server 14, which is the content source for that document. In response, the server 14 returns 20 the Web document to the proxy 12, where a copy is stored 22. In addition, the proxy 12 inserts 24 additional computer-readable instructions into a copy of the Web document to be returned to client 10, and then so returns 26 the newly modified Web document.

Upon receipt of the modified Web document, client 10 executes the computer-readable instructions that were added at proxy 12. The instructions cause the client 10 to report 28 certain information regarding the content of the Web document back to the proxy 12. In one embodiment of the invention, such a report may be delivered in the context of a request made to a Web address which the proxy 12 knows to be a "dummy" address. That is, the instructions inserted by the proxy 12 may be such as to cause the client 10 to issue what the client interprets as a customary request for an additional document or object (as would be the case for, say, an embedded object in the current Web document). That request will be directed to an address specified by the instructions inserted by proxy 12, which address may have been previously configured by a network administrator. The address is recognized by proxy 12 as being indicative of a report being returned by client 10 and so proxy 12 does not subsequently forward the request to any content source. Instead, the proxy extracts other information included with the request.

This other information is the report sought by proxy 12 regarding the content of the original Web document requested by the client 10 (i.e., the Web document into which the instructions to report back were inserted). Recognize that in addition to simply causing the client to make the "dummy" request, the instructions added by proxy 12 before delivery of the original Web document to the client 10 may further be such as to cause client 10 to gather certain information regarding the Web document and include that information in the body of the report 28 made to proxy 12. In this way, proxy 12 may instruct client 10 to gather and report a variety of types of information so that proxy 12 will be better able to determine whether the original Web document is subject to any existing traffic policies for which proxy 12 is responsible for implementing.

Such information may be used in conjunction with later requests for the same Web document. For example, if it is determined that the Web document is not one which users should have access to, later requests therefor can be blocked by proxy 12. This may be done through appropriate annotation of a Web content log maintained by proxy 12.

One example of the type of information which proxy 12 may cause client 10 to report back is the presence (or absence) of any so-called "Active-X controls" contained within the originally requested Web document. Active-X controls are software components that can be used to provide enhanced functionality to Web browsers. For example, such controls can enable the viewing of documents other than html documents (e.g., spreadsheets). However, these controls can be used in malicious fashions to cause Web browsers to perform undesirable actions and so network administrators for corporate networks often restrict or forbid the downloading of Web pages including such controls.

Without the assistance of the above-described report from the client it can be very difficult for a proxy to detect whether or not Active-X controls are included in a Web page. This is because of the way such controls can be hidden in Web pages, for example as encoded JavaScript elements (which may be executed differently by a Web browser than by a proxy) used to invoke HTML<OBJECT> elements. Using the methods of the present invention, however, the proxy can receive a detailed report from the client (in response to the execution of the inserted computer-readable instructions) which is delivered as the additional request to the Web address indicated by those instructions.

In some cases, in order to facilitate this reporting mechanism, the client 10 may be instructed to load an image or an i-frame (the <IMG> or <IFRAME> element can be dynamically generated by the inserted computer-readable instructions). The information to be reported can be encoded in the URL of the image or i-frame, or it can be included in a cookie that is sent with the request to load same. A cookie is a small text file. The URL (uniform resource locator) does not necessarily have to be directly addressed to the proxy 12, but because proxy 12 is located in the client's data path it will nevertheless intercept the new request and recognize the nature thereof by virtue of the special URL. Consequently, the proxy 12 will be able to properly process this request as actually being a report by the client 10.

In addition to reporting on the number and/or type of Active-X controls contained within a Web page, this "browser callback" operation is generally applicable to any instance of an augmented Web browser (augmented by virtue of the computer-readable instructions inserted by proxy 12) reporting information to a proxy after receiving and processing a Web page. Among the kinds of information that may be so reported are attempts to exploit known security flaws in commercially available Web browsers (which would likely be detected and blocked by appropriately upgraded Web browsers) and other undesirable behavior by downloaded Web pages.

Another example of the proxy 12 inserting information into a Web document requested by the client 10 concerns measures designed to foil so-called "phishing attacks". Phishing has become a significant concern among legitimate businesses operating Web sites and consumers making use of such sites. Most phishing attacks originate with an e-mail message from what appears to be a legitimate business or other trusted source but which is really transmitted by person seeking to steal confidential information of the recipient. Such e-mail messages generally contain a hyperlink to a counterfeit Web site designed to mimic the actual Web site of the trusted source. For example, the hoax e-mail message might indicate that a "problem" exists with a user's account and invite the user to remedy the problem by selecting the hyperlink included in the message to visit the host's Web site and log-in. Often these hyperlinks are cleverly disguised to look like the Web addresses of the trusted source, but in fact direct the user's Web browser to the counterfeit Web site. Once at the counterfeit site, an unsuspecting user might enter his or her log-in or other personal information seeking to access his/her account, but instead the user will have unwittingly transferred that information to the phishing attacker who can then use it to gain access to the user's real account.

The present invention helps safeguard users against such attacks by injecting computer-readable instructions into Web documents, which instructions cause the user's Web browser to display the actual Web address being visited by the browser. That is, the present invention helps foil the phisher's ability to deceive the user into thinking that he/she is visiting the Web site of the legitimate business or other trusted source. The true Web address of the Web site being visited may be displayed in a banner or other fashion at a conspicuous position on the Web page as it is being rendered by the user's Web browser.

Note that it would not be desirable to inject the instructions for displaying the true Web address into every Web page inasmuch as the information is not truly needed unless the user is being asked to provide some type of information. Hence, in one embodiment of the invention such instructions are only injected into Web documents containing a Web form. In general, a Web form is a collection of form fields displayed as a Web page by a browser in response to hypertext mark-up language (HTML) tags and other information. These tags can be used to aid in identifying the presence of a Web form. Restricting the display of this information to such occasions may also help in focusing the user's attention as it will not be something that the user is accustomed to seeing on each Web page.

Variations of phishing attacks include so-called "homograph attacks" in which forged Web addresses include non-ASCII characters in place of ASCII characters in legitimate Web addresses. For example instead of the legitimate Web address www.trustedsite.com, the forged site might have an address www.trustedsite.com, where the Greek symbol Iota "i" has replaced the letter "i" in the address.

To protect against such attacks the computer-readable instructions inserted by the proxy 12 may instruct the Web browser to display non-ASCII characters (such as the Iota symbol) in a different color or highlight them in some other fashion along with displaying a warning to the user that the site being visited may be a falsified Web site. Of course the variety of warning methods that may be employed is quite extensive and the above are only intended as examples.

A further embodiment of the invention also involves having the client application assist in traffic policy enforcement, but instead of having the proxy inject computer-readable instructions into various Web documents in this case a plug-in application is downloaded from the proxy to the Web browser client. Plug-in applications are supplementary computer programs that can be installed and used as part of a Web browser, for example to play audio files, display motion video files or perform other functions. For Microsoft's Internet Explorer Web browser the plug-in may be a Browser helper Object. For Mozilla's Firefox Web browser the plug-in may be an XPI plug-in. Other plug-in varieties may be used with other Web browser applications. In any event, the plug-in application functions to include contextual information with a request made by a Web browser so that a proxy receiving the request can more readily determine which policies apply thereto and/or to the Web documents sought by the request. In some instances the plug-ins may also be used to receive instructions from the proxy to take steps to enforce traffic policies locally at the client application.

As indicated above, it is often difficult to configure a proxy to enforce traffic policies because the proxy is not provided with sufficient information to know whether or not a particular policy applies in the context of a given request by a client. Hence, in one embodiment of the present invention, a plug-in application downloaded from the proxy (or another source) to the client application (typically a Web browser, but it could be another form of software application that makes requests from the Internet) is configured to add contextual information to such requests so that the proxy can better determine which, if any, traffic policies apply thereto and/or to documents returned in response to such requests.

Figure 2:
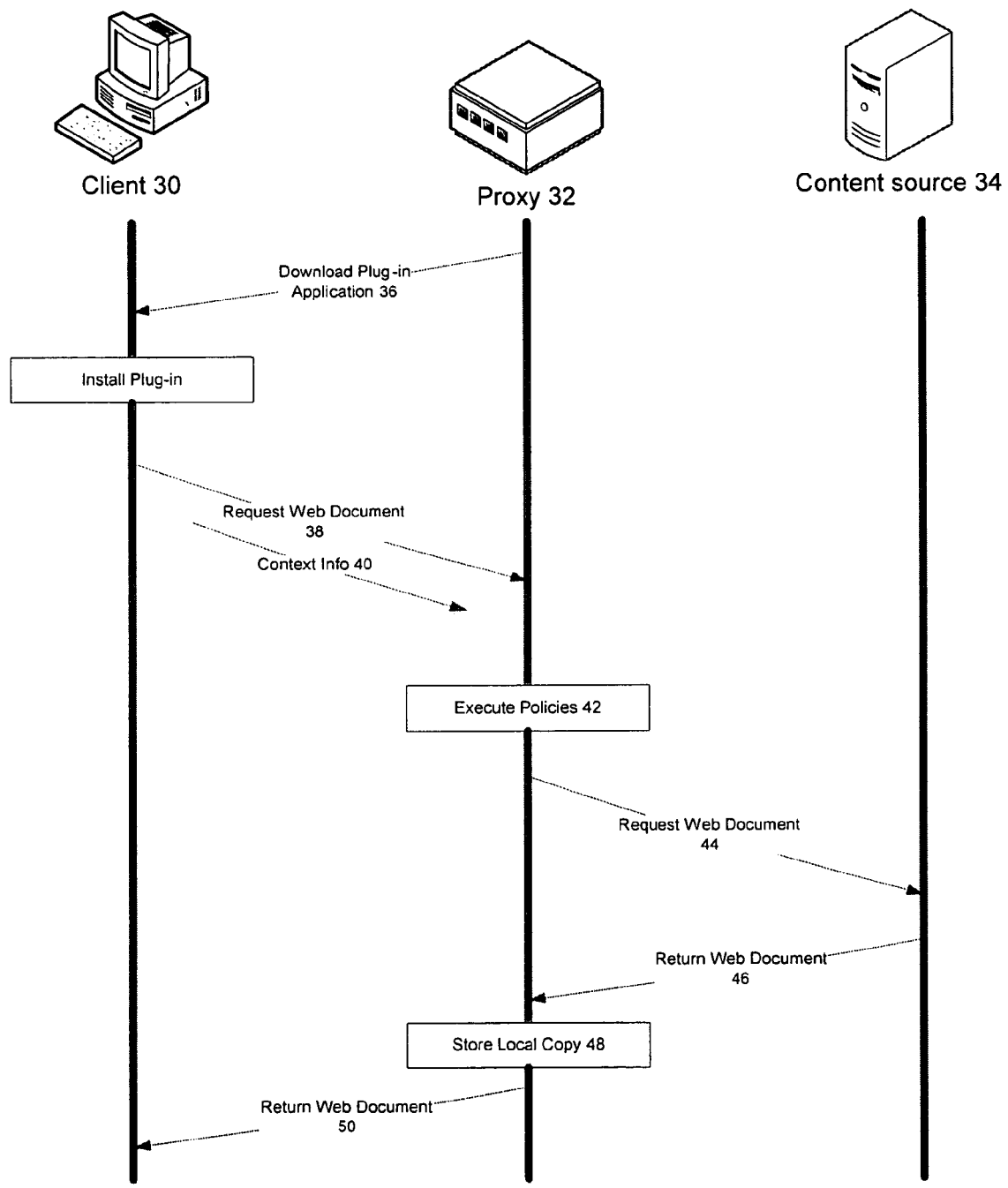
FIG. 2 illustrates an example of a communication session between a client application, a proxy server and a content source in which the proxy server downloads to the client application a plug-in that will operate to enforce traffic policies in accordance with embodiments of the present invention.

An example of this process is shown in FIG. 2. At some point in time a plug-in application is downloaded 36 to client application 30 from proxy 32. The plug-in is installed in the client application (such details being within the competency of those practicing in the art they will not be discussed in detail herein) and then at a later time when the client 30 makes a request 38 for a Web document, the plug-in application attaches contextual information 40 to that request. Examples of such contextual information include, but are not limited to, the source of the URL to which the request 38 is directed. For example, the URL may have been typed directly into the Web browser's address bar, or it may have been selected from a "Favorites" or "Bookmark" menu. Alternatively, the URL may have been an href in an <a> tag (i.e., included in a hyperlink in another document). In addition to the source of the URL the plug-in application may be configured to include information identifying the object referenced by the URL. For example the URL may indicate an embedded image or object in another Web document, it may name a script (e.g., if referenced by a <script> tag) or a style sheet (if referenced by a <style> tag), or it may have been referenced by a <frame> or <iframe> tag. In each case the proxy 32 may have different applicable policies that need to be run 42 to assess whether or not to block the request.

If the request is not blocked, the proxy may forward 44 same to content source 34 (assuming the proxy does not have a locally stored or fresh copy of the requested item), which responds 46 with a copy of the requested item. Assuming the item is not blocked due to policy reasons, a copy of the returned Web document or other item may be stored at the proxy 32 and, an additional copy forwarded 50 to client 30.

In still further embodiments of the present invention the plug-in application may receive coded instructions from the proxy to take steps to enforce traffic policies locally (i.e., at the Web browser or other client application level). Such instructions may be inserted into Web documents returned by the proxy to the client in a fashion similar to that discussed above, the difference being that it is the plug-in application and not the Web browser that is responsible for executing the instructions and taking the appropriate actions. Further, the plug-in may be configured to report back to the proxy regarding the content or other attributes of Web documents as discussed above.

Installing or upgrading a plug-in application such as that discussed above can be done in a straightforward fashion. Initially, the proxy can detect the presence or absence of the plug-in, and/or its version if one is installed at the client, based on the content of a request issued by the client application. For example, the plug-in may be configured to announce its presence/version by including a special form of header information in the HTTP header of a client request. Thus, if the proxy seeks to enforce a policy that requires the presence of a plug-in application and a client request does not include header information consistent with the plug-in being installed at the client, then the proxy may return an HTML response page that advises the user of the need to install the plug-in before the request can be honored. Such a response page may be configured in any convenient fashion. For example it may include a hyperlink to an address from which the plug-in application can be downloaded and installed. Alternatively, depending on the Web browser being used, the response page may contain an Active-X control or Firefox XPI that installs the plug-in application automatically (subject to user authorization).

In some embodiments of the invention it may be appropriate to allow the proxy's policy enforcement mechanisms to "degrade gracefully" if the plug-in application is not installed at the client. For example, policies may be enforced to the best extent possible in the absence of the plug-in. Or, alternative forms of policy enforcement (e.g., using the injected instruction scheme described above) may be implemented.

In some cases, HTTP communications between the plug-in and the proxy will be subject to security constraints. Hence, some communications may need to be encrypted and/or authenticated in order to prevent eavesdroppers from misappropriating user authentication credentials and the like, or to guard against spoofing or other attacks by unauthorized persons/computer systems. To accommodate these situations the plug-in—proxy communications may utilize a secure form of HTTP communication, known as HTTPS.

HTTPS communications between the plug-in application and the proxy may make use of well know known public key-private key asymmetric encryption schemes. For example, the proxy may make use of a private key that is exclusive to a particular enterprise and the plug-in may use a corresponding public key. The details regarding the use of such encryption methodologies are well known in the art and so will not be discussed further herein.

In cases where the client application has an out-of-date version of a plug-in application installed, the proxy can notify the user of the need to upgrade that version of the plug-in and may, in some cases, refuse any requests until such upgrade has been completed. Alternatively, the upgrading process may be performed transparently (from the user's point of view). For example, in response to a client request, the proxy may determine which version of a plug-in is currently installed (e.g., by examining version information included in the request header). If the version is one not currently supported, the proxy may return an HTTP response with a code that indicates to the plug-in application the need to upgrade to a newer version thereof. Such a response may include, for example as part of a header, a URL (or other address information) from which the upgraded version of the plug-in may be obtained. Thereafter, the client may make a request to the designated URL, for example an HTTPS request which will result in a secure sockets layer (SSL) certificate being returned by the proxy. If this certificate does not match a trusted proxy certificate stored in the plug-in the client may terminate the communications session. Otherwise, the client will accept a download of the new plug-in application, install it, and then reissue the original request (which the proxy can now serve). Such activities may happen transparently, without requiring user interaction.

The plug-in application may perform policy enforcement in the same manner as executable instructions downloaded to a client application from a proxy, without the need to insert such instructions in multiple Web documents. Hence, the use of a plug-in may help reduce latencies that might otherwise be experienced. In addition, because the plug-in executes at the client-end of the communication the plug-in will be aware of the context within which requests are made by the client application. Hence, the plug-in can implement traffic policies in a context-aware fashion and thereby provide policy enforcements that a proxy alone might be incapable of so providing. As indicated above, such a plug-in may also report certain information to the proxy, including context information and/or Web document content, statistics or other data, to allow the proxy to better execute its policy-based controls.

Thus, methods and systems for provisioning client applications such as Web browsers to perform various actions related to such enforcement activities have been described. Although several examples of such methods and systems were discussed above, these examples should not be read as limiting the broader scope of the present invention, as reflected in the following claims.

What is claimed is:

1. A method, comprising:
   receiving at a proxy server a request for a Web document, said request originating from a client application executing on a client device communicably coupled to the proxy server;
   retrieving, by the proxy server, a copy of the requested Web document, the proxy server modifying the requested Web document by inserting a set of computer-readable instructions which when executed by a processor of the client device on which the client application runs cause the client application to perform one or more activities associated with network traffic policy enforcement, including reporting, to the proxy server, information concerning the Web document;
   downloading, from the proxy server to the client application, a modified version of the requested Web document that includes the set of computer-readable instructions;
   receiving, at the proxy server and from the client application responsive to execution of the set of computer-readable instructions by the processor of the client device on which the client application runs, the information concerning the Web document, the proxy server using said information to determine whether the Web document is subject to an existing network traffic policy; and
   if the Web document is subject to the existing network traffic policy, enforcing the existing network traffic policy in connection with subsequent requests for the Web document; otherwise, not enforcing the existing network traffic policy in connection with subsequent requests for the Web document.

2. The method of claim 1, wherein the client application comprises a Web browser.

3. The method of claim 1, wherein the computer-readable instructions are embodied as a plug-in application for the client application.

4. The method of claim 1, wherein the computer-readable instructions are embodied as executable JavaScript.

5. The method of claim 1, wherein the computer-readable instructions are embodied as executable Active-X controls.

6. The method of claim 1, wherein the computer-readable instructions are embodied as executable Java instructions.

7. The method of claim 2, wherein when the computer-readable instructions are executed by said processor, said instructions cause the client application to report, to the proxy server, contextual information regarding requests for Web documents made by the Web browser.

8. A method as in any one of claims 1-6, wherein when the computer-readable instructions are executed by said processor, said instructions cause the client application to report, to the proxy server, information regarding requests made by the client application.

9. A method as in any one of claims 1-6, wherein when the computer-readable instructions are executed by said processor, said instructions cause the client application to report, to the proxy server, information about a current state of the client application.

10. A method as in any one of claims 1-6, wherein when the computer-readable instructions are executed by said processor, said instructions cause the client application to report, to the proxy server, an indication of a source of a uniform resource locator (URL) to which one or more requests made by the client application are directed.

11. A method as in any one of claims 1-6, wherein when the computer-readable instructions are executed by said processor, said instructions cause the client application to report, to the proxy server, information identifying an object referenced by a uniform resource locator (URL) to which one or more requests by the client application are directed.

12. A method as in any one of claims 1-6, wherein when the computer-readable instructions are executed by said processor, said instructions cause the client application to report, to the proxy server, information about (i) a current state of the client application, and (ii) a context in which a request by the client application is being made.

13. A method as in any one of claims 1-6, wherein when the computer-readable instructions are executed by said processor, said instructions cause the client application to take one or more actions to enforce the network traffic policy locally.

14. A method as in any one of claims 1-6, wherein when the computer-readable instructions are executed by said processor, said instructions cause the client application to report, to the proxy server, information identifying an object referenced by a uniform resource locator (URL) to which one or more requests by the client application are directed, the URL indicating an embedded image in the Web document.

15. A method as in any one of claims 1-6, wherein when the computer-readable instructions are executed by said processor, said instructions cause the client application to report, to the proxy server, information identifying an object referenced by a uniform resource locator (URL) to which one or more requests by the client application are directed, the URL indicating an embedded object in the Web document.

16. A method as in any one of claims 1-6, wherein when the computer-readable instructions are executed by said processor, said instructions cause the client application to report, to the proxy server, information identifying an object referenced by a uniform resource locator (URL) to which one or more requests by the client application are directed, the URL naming a script.

17. A method as in any one of claims 1-6, wherein when the computer-readable instructions are executed by said processor, said instructions cause the client application to report, to the proxy server, information identifying an object referenced by a uniform resource locator (URL) to which one or more requests by the client application are directed, the URL identifying a style sheet.

18. A method as in any one of claims 1-6, wherein when the computer-readable instructions are executed by said processor, said instructions cause the client application to report, to the proxy server, information identifying an object referenced by a uniform resource locator (URL) to which one or more requests by the client application are directed, the URL referenced by a <frame> or <iframe> tag.

19. A proxy server, comprising: a processor; a storage device connected to the processor; and
   a first set of computer-readable instructions on the storage device, said first set of instructions being executable by the processor and including: a first module configured to
      receiving a request for a Web document, said request originating from a client application executing on a client device communicably coupled to the proxy server;
      retrieve a copy of the requested Web document;
      modify the requested Web document by inserting a second set of computer-readable instructions which when executed by a processor of the client device on which the client application runs cause the client application to perform one or more activities associated with network traffic policy enforcement, including reporting, to the proxy server, information concerning the Web document; and send to the client application a modified version of the Web document that includes the second set of computer-readable instructions;

a second module configured to receive from the client application, responsive to execution of the second set of computer-readable instructions by the processor of the client device on which the client application runs, said information concerning the Web document;

a third module configured to use said information to determine whether the Web document is subject to an existing network traffic policy; and a fourth module configured to (i) enforce, if the Web document is subject to the existing network traffic policy, the existing network traffic policy in connection with subsequent requests for the Web document, otherwise, (ii) not enforce the existing network traffic policy in connection with subsequent requests for the Web document.

20. The proxy server of claim 19, wherein the proxy server receives said information concerning the Web document at an address specified by the second set of computer-readable instructions.

* * * * *